United States Patent
Meissner et al.

(10) Patent No.: US 9,937,619 B2
(45) Date of Patent: Apr. 10, 2018

(54) CONTROL METHOD FOR A ROBOT

(75) Inventors: Alexander Meissner, Stuttgart (DE); Bjorn Schoell, Asperg (DE); Jens Hacker, Markgröningen (DE); Viktor Schretling, Asperg (DE); Thomas Hezel, Asperg (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 653 days.

(21) Appl. No.: 14/238,824

(22) PCT Filed: Aug. 17, 2012

(86) PCT No.: PCT/EP2012/003515
§ 371 (c)(1),
(2), (4) Date: Nov. 4, 2014

(87) PCT Pub. No.: WO2013/026554
PCT Pub. Date: Feb. 28, 2013

(65) Prior Publication Data
US 2015/0057798 A1 Feb. 26, 2015

(30) Foreign Application Priority Data
Aug. 24, 2011 (DE) .................. 10 2011 111 758

(51) Int. Cl.
*G05B 19/04* (2006.01)
*G05B 19/18* (2006.01)
*B25J 9/16* (2006.01)

(52) U.S. Cl.
CPC ... *B25J 9/1638* (2013.01); *G05B 2219/39176* (2013.01); *G05B 2219/39194* (2013.01)

(58) Field of Classification Search
CPC ......... B25J 9/1638; G05B 2219/39176; G05B 2219/39194
(Continued)

(56) References Cited

U.S. PATENT DOCUMENTS

| | | | | |
|---|---|---|---|---|
| 4,819,184 A | * | 4/1989 | Jonsson | G05B 19/373 700/250 |
| 6,226,565 B1 | * | 5/2001 | Elfving | B25J 9/163 700/250 |

(Continued)

FOREIGN PATENT DOCUMENTS

| | | |
|---|---|---|
| DE | 19914245 A1 | 10/1999 |
| DE | 69714017 T2 | 3/2003 |

(Continued)

*Primary Examiner* — Harry Y Oh
(74) *Attorney, Agent, or Firm* — Bejin Bieneman PLC

(57) ABSTRACT

The invention relates to a control method for a robot (1) having a plurality of movable robot axes (2, 4, 6), in particular for a painting robot (1) or a manipulating robot, comprising the following steps: (a) predetermining a robot path by means of a plurality of path points through which a reference point of the robot (1) is intended to travel; (b) controlling drive motors of the individual robot axes (2, 4, 6) according to the predetermined robot path, such that the reference point of the robot (1) travels through the predetermined robot path; (c) precalculating the mechanical loading (My1, Mx1, Fx1, Fy1, Fz1, Fx2, Fy2, Fz2, Mx2, My2, Mz2) that occurs within at least one of the robot axes (2, 4, 6) between two joints when travelling through the robot path ahead; and also (d) adjusting the control of the drive motors of the robot axes (2, 4, 6) on the basis of the precalculated mechanical loading (My1, Mx1, Fx1, Fy1, Fz1, Fx2, Fy2, Fz2, Mx2, My2, Mz2), such that a mechanical overload is avoided.

8 Claims, 2 Drawing Sheets

Figure 1:
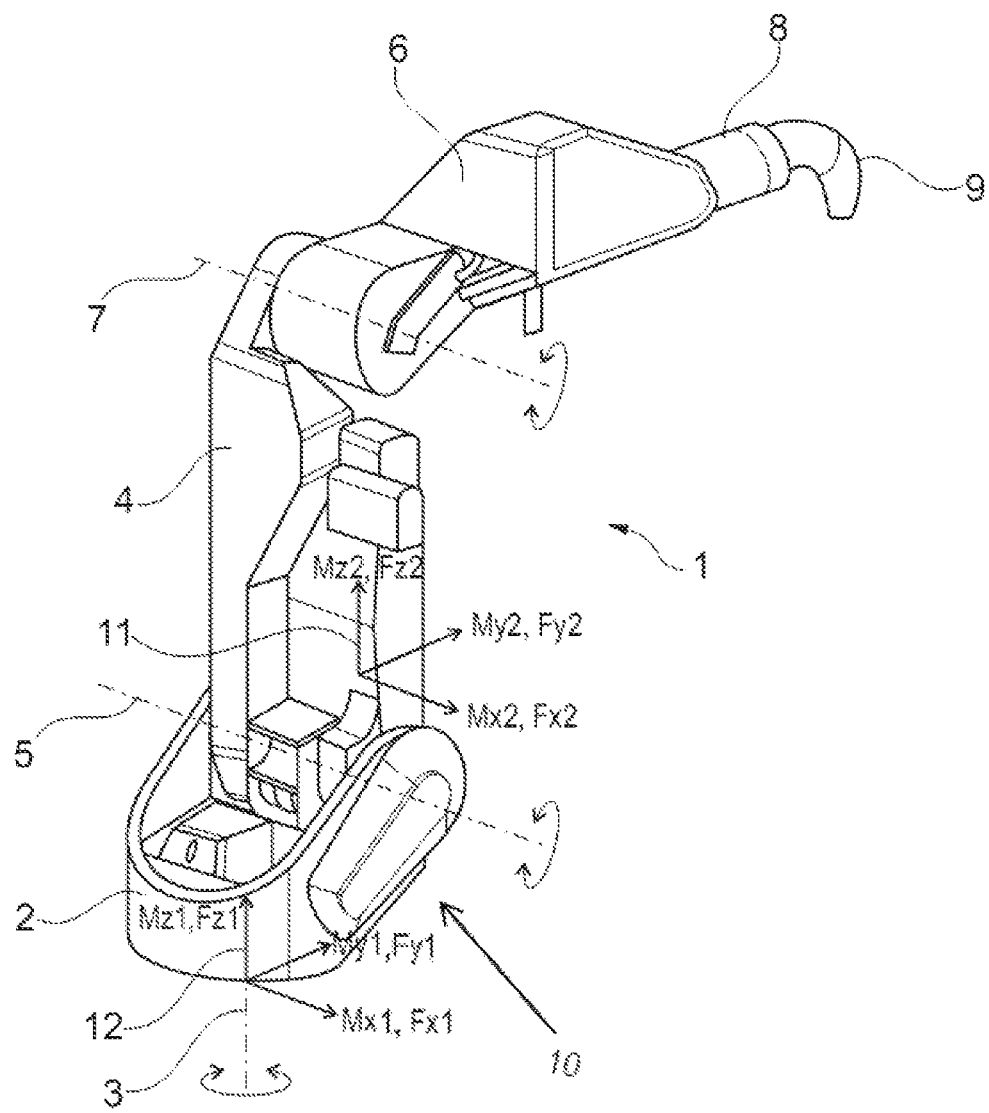

(58) Field of Classification Search
USPC .......................................................... 700/250
See application file for complete search history.

(56) References Cited

U.S. PATENT DOCUMENTS

| | | | | |
|---|---|---|---|---|
| 6,826,450 B2* | 11/2004 | Watanabe | ............... | B25J 9/1638 |
| | | | | 219/124.34 |
| 7,145,300 B2* | 12/2006 | Takahashi | ............... | G05B 19/19 |
| | | | | 318/35 |
| 2002/0173878 A1* | 11/2002 | Watanabe | ............... | B25J 9/1638 |
| | | | | 700/245 |
| 2005/0001577 A1* | 1/2005 | Takahashi | ............... | G05B 19/19 |
| | | | | 318/599 |

FOREIGN PATENT DOCUMENTS

| | | | |
|---|---|---|---|
| DE | 102007024143 A1 | 11/2008 |
| EP | 0262600 A1 | 4/1988 |
| EP | 1250986 A2 | 10/2002 |
| EP | 1980374 A2 | 10/2008 |
| EP | 2146825 | 11/2008 |
| JP | H09123075 A | 5/1997 |
| WO | WO 9729890 | 8/1997 |

* cited by examiner

CONTROL METHOD FOR A ROBOT

A control of a robot may be applied to a painting robot or a handling robot in a painting installation.

EP 2 146 825 A1 describes a control method for a robot, which takes path correction values into account for the robot during control of the movement, so that the robot path traversed by the robot corresponds as exactly as possible with a predefined robot path. Here, the path correction values take into account the elasticity, friction and/or inertia of the robot in accordance with a dynamic robot model. This case assumes rigid robot axes, so that the deviation between the actual robot path and the predefined robot path merely results from mechanical resiliencies in the individual joints between the neighboring robot axes. This known control method for a robot therefore in no way takes into account mechanical loads which occur within the individual robot axes, for example within a robot arm between two neighboring joints. Furthermore, this known control method merely takes into account torques that are oriented parallel to the pivoting plane of the respective joint, i.e. torques that are oriented parallel to the pivot axis of the respective joint. For example, in the case of a robot movement, torques also occur transversely with respect to the direction of movement, which torques may under certain circumstances lead to mechanical overload and were not taken into account hitherto by the known control methods.

Robot controls are also known from DE 199 14 245 A1, DE 10 2007 024 143 A1, DE 697 14 017 T2 and EP 0 262 600 A1. For these robot controls, however, at best, the mechanical load is taken into account, which acts in the respective pivoting plane of the individual robot axes.

The presently disclosed subject matter is based upon the technical insight that, during the operation of a multi-axis robot, the mechanical load in the respective pivoting plane should be noted, but also the mechanical load that occurs transversely with respect to the respective pivoting plane may be considered.

The term "mechanical load oriented transversely with respect to the pivoting plane" used herein comprises in particular a tilting moment, which is oriented at right angle to the pivot axis of the respective joint, and thus parallel to the pivoting plane. In addition, this term also comprises forces that are oriented at right angle to the pivot axis.

Accordingly, the present disclosure includes the general technical teaching of pre-calculating, during the operation of a robot, a mechanical load that may occur when the robot passes through an upcoming robot path. In this case, it should be noted that the mechanical load is pre-calculated, i.e., the mechanical load is not measured or modeled for the actual movement status, but rather pre-calculated based on a predefined robot path and known mechanical properties (e.g. geometry, mass distribution, etc.) of the robot for the upcoming section of the robot path, so that counter-measures can be initiated when the pre-calculated mechanical load is too high.

Further disclosed herein is that control of drive motors of individual robot axes may be adapted depending on the pre-calculated mechanical load, so that a mechanical overload is avoided.

An option for the adaptation of the control of the drive motors of the robot axes to avoid a mechanical overload includes braking and/or slowing movement of the robot to avoid the mechanical overload, which otherwise occurs.

Another option for the adaptation of the control of the drive motors of the robot axes to avoid a mechanical overload is to slightly modify or adapt the predefined robot path.

The pre-calculated mechanical load may be compared with at least one limit value in order to detect an upcoming mechanical overload. Then, if necessary, the above-mentioned exemplary counter-measures can be initiated.

Certain forces and/or torques, which act within the robot axes or in a joint may be selected. Thus, during the monitoring of the mechanical load, not all forces and torques that occur within the individual robot axes or in a joint are monitored. For example, certain robot axes can be selected for monitoring. Moreover, certain mechanical loads can be selected within the selected robot axes or in a joint for monitoring, such as torques or forces that are transverse with respect to the direction of movement.

The individual robot axes may be each pivotably mounted relative to one another within a certain pivoting plane, wherein the mechanical load within the individual robot axes transversely with respect to the respective pivoting plane is pre-calculated. For the pre-calculation of the mechanical load a tilting moment may be calculated that acts within the respective robot axis and that is oriented at right angle to the pivot axis of the respective robot axis.

Drive motors of individual robot axes may be controlled by position controllers that receive target values from a central robot control, wherein the sequence of the predefined target values defines the desired robot path. This specification of the target values by the central robot control is preferably clocked with a certain interpolator clock-pulse. Further, the pre-calculation of the mechanical load and, if necessary, the initiation of counter-measures, are likewise clocked in the interpolator clock-pulse. Yet further, the mechanical load can be pre-calculated in a multi-dimensional manner, wherein, within the context of pre-calculation of the mechanical load, torques as well as forces can be calculated.

Furthermore, almost any coordinate system can be set, the coordinate origin of which is arranged within one of the robot axes, or in a joint and is fixed relative to the robot axis, so that the coordinate system moves along with the robot axis. The pre-calculated mechanical load then refers to this virtual coordinate system. In this case, certain forces and/or torques, arising in the coordinate system during the movement of the robot, can be selected, wherein the mechanical load is represented by the selected forces and/or torques.

In addition to a control method a robot control is likewise disclosed, the control being programmed such that it carries out the disclosed control method.

A robot system is disclosed that includes at least one multi-axis robot (e.g. handling robot, painting robot), and a robot control that carries out the disclosed control method. Accordingly, also disclosed in protection for a complete painting installation or a paint cabin in such a painting installation.

Figure 2:
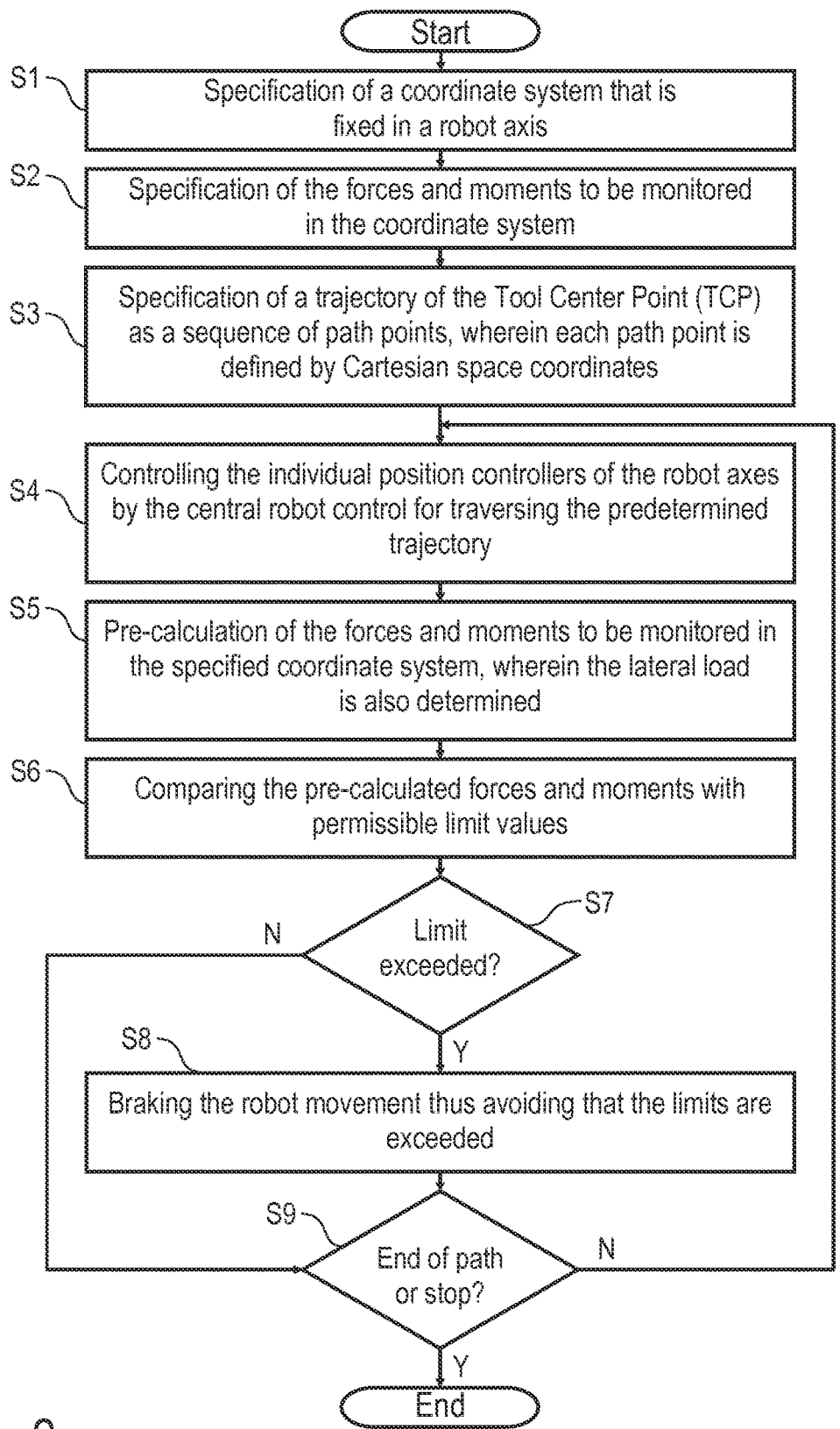

Other advantageous developments are characterized in sub-claims or are explained in more detail below together with the description of the preferred exemplary embodiment of the invention on the basis of the figures. The figures show as follows:

FIG. 1: a perspective view of a painting robot, which is controlled in accordance with a control method; and FIG. 2: a flow diagram illustrating an exemplary control method.

FIG. 1 shows a painting robot 1 that can be used, for example, for painting motor vehicle body parts in a painting installation.

In this exemplary embodiment, the painting robot 1 has a robot base 2, which is rotatable about a vertical rotation axis 3. Other painting robots, the robot base of which is arranged stationary or linearly moveable along a guide rail, could be used in the context of the present disclosure.

A proximal robot arm 4 is pivotably mounted on the robot base 2, wherein the robot arm 4 is pivotable about a horizontal pivot axis relative to the robot base 2.

A distal robot arm 6 is pivotably mounted on the distal end of the proximal robot arm 4, wherein the distal robot arm 4 is pivotable about a horizontal pivot axis 7 relative to the proximal robot arm 4.

A multi-axis robot wrist 8, which is known for guiding a conventional rotary atomizer 9 in a highly mobile manner, is attached to the distal end of the robot arms 6.

The painting robot 1 is controlled by a robot control 10, which is known. The robot control 10, however, carries out a novel control method to avoid a mechanical overload of the painting robot 1 during the operation of the painting robot 1. The robot control 10 calculates mechanical loads, which occur within the robot base 2, within the robot arm 4, or within the robot arm 6.

For example, a coordinate system 11 can be set, having its coordinate origin within the proximal robot arm 4. During pre-calculation of the mechanical load, forces $Fx2$, $Fy2$, $Fz2$, and torques $Mx2$, $My2$, $Mz2$, can then be pre-calculated in the coordinate system 11 during the operation of the painting robot 1.

In addition, FIG. 1 shows a further coordinate system 12, having its coordinate origin in the swivel joint between the robot base 2 and a floor. In the coordinate system 12, mechanical loads likewise occur in the form of forces $Fx1$, $Fy1$, $Fz1$, and torques $Mx1$, $My1$, $Mz1$, which are also taken into account within the context of the present control method. In this exemplary embodiment, for example, the tilting moments $Mx1$, $My1$, and the forces $Fx1$, $Fy2$, which are oriented at a right angle to the rotation axis of the swivel joint, are monitored.

In the following, the present control method will now be described with reference to the flow chart shown in FIG. 2.

In a first step S1, a coordinate system is predefined, having its coordinate origin within one of the robot axes and being spatially fixed on the robot axis, so that the coordinate system moves along with the robot axis. For example, the pre-defined coordinate system of this step S1 can be the coordinate system 11 represented in FIG. 1.

In a further step S2, forces and/or torques to be monitored in the coordinate system are then defined. For example, the torque $My2$ and the force $Fx2$ could be defined in the coordinate system 11, and the torques $Mx1$ and $My1$ could be defined in the coordinate system 12.

In a further step S3, a trajectory of the Tool Center Point (TCP) is then specified as a sequence of path points, wherein each path point is defined by Cartesian space coordinates.

During the actual operation of the painting robot 1, the individual position controllers of the robot axes are then controlled by the central robot control for the robot 1 to traverse the predetermined trajectory, which corresponds to step S4 and is known.

When traversing the predefined trajectory, the forces to be monitored (e.g., the torques $Mx1$, $My1$, $My2$, and the force $Fx2$) are then pre-calculated in a step S5 in order to detect any upcoming mechanical overload in time to respond thereto.

In a step S6, the pre-calculated forces and moments are then compared with permissible limit values.

In a step S7, checks are made to see whether the mechanical load is about to be exceeded.

If the mechanical load is about to be exceeded, counter-measures are initiated in a step S8, which counter-measures can include slowing the robot movement via braking.

In a step S9, checks are then made to see whether the end of path is reached or whether the robot 1 movement has been stopped for any other reasons. Otherwise, the steps S4-S9 are repeated in a loop.

The invention is not limited to the previously described preferred exemplary embodiment. Instead, many variants and modifications are possible, which also make use of the concept of the invention and thus fall within the scope of protection. Furthermore, the invention also claims protection for the subject-matter and the features of the subclaims independently of the claims to which they refer.

The invention claimed is:

1. A method for controlling a robot having several movable robot axes, wherein the robot axes are each pivotable, the method comprising:
    specifying a robot path through a plurality of path points, to be traversed by a reference point of the robot;
    controlling drive motors of respective individual robot axes in accordance with the robot path, so that the reference point of the robot traverses the path points,
    precalculating at least one tilting moment within at least one robot axis that is predicted to occur when traversing the upcoming robot path,
    the controlling of the drive motors being adapted depending on the at least one precalculated tilting moment.

2. The method according to claim 1, wherein the at least one tilting moment occurs between two joints.

3. The method according to claim 1, further comprising:
    comparing the at least one tilting moment with at least a limit value for detection of an upcoming mechanical overload; and
    braking movement of the reference point on the robot path when an upcoming mechanical overload is detected.

4. The method according to claim 1, wherein
    the drive motors of the robot axes are each controlled by respective position controllers,
    the position controllers receive target values from a central robot control,
    the central robot control outputs the target values clocked with an interpolator clock-pulse to the position controllers, and
    pre-calculation of the at least one tilting moment is clocked in the interpolator clock-pulse.

5. The method according to claim 1, wherein
    the at least one tilting moment is pre-calculated multi-dimensionally; and
    during the pre-calculation of the at least one tilting moment, each of torques and forces are calculated.

6. The method according to claim 1, further comprising:
    specifying a coordinate system having a coordinate origin that is within one of the robot axes and fixed relative to the one of the robot axes, whereby the coordinate system moves along with the robot axis;
    selecting at least one of forces and torques that arise in the coordinate system during the movement of the robot; and
    determining the at least one tilting moment from the selected forces and/or torques.

7. A robot control for controlling a robot having several movable robot axes, wherein the robot control is configured to carry out the method according to claim 1.

8. A robot system, comprising:
   at least one multi-axis robot, in particular a painting robot or a handling robot, and
   a robot control according to claim 7.

* * * * *

UNITED STATES PATENT AND TRADEMARK OFFICE
CERTIFICATE OF CORRECTION

| | | |
|---|---|---|
| PATENT NO. | : 9,937,619 B2 | Page 1 of 1 |
| APPLICATION NO. | : 14/238824 | |
| DATED | : April 10, 2018 | |
| INVENTOR(S) | : Meissner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this
Sixth Day of December, 2022

Katherine Kelly Vidal
*Director of the United States Patent and Trademark Office*